(12) United States Patent
Yu et al.

(10) Patent No.: US 7,969,674 B2
(45) Date of Patent: Jun. 28, 2011

(54) DATA TRANSFER ASSEMBLY PERFORMANCE CHARACTERISTICS TESTING

(75) Inventors: Ning Yu, Eden Prairie, MN (US);
Puneet Bhargava, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 188 days.

(21) Appl. No.: 12/245,597

(22) Filed: Oct. 3, 2008

(65) Prior Publication Data

US 2010/0085654 A1 Apr. 8, 2010

(51) Int. Cl.
*G11B 27/36* (2006.01)
(52) U.S. Cl. .............................. 360/31; 360/71; 360/75
(58) Field of Classification Search ........................ None
See application file for complete search history.

(56) References Cited

U.S. PATENT DOCUMENTS

| | | | | |
|---|---|---|---|---|
| 4,646,557 A * | 3/1987 | Park | | 73/9 |
| 5,815,255 A * | 9/1998 | Van Ochten et al. | | 356/138 |
| 5,859,357 A * | 1/1999 | Kameyama et al. | | 73/9 |
| 6,172,950 B1 * | 1/2001 | Tanaka | | 369/44.32 |
| 6,181,669 B1 * | 1/2001 | Park | | 720/697 |
| 6,493,296 B1 * | 12/2002 | Fukumoto et al. | | 369/44.32 |
| 6,568,289 B2 * | 5/2003 | Nakajima | | 73/865.8 |
| 6,757,237 B2 * | 6/2004 | Kong | | 720/700 |
| 6,765,765 B2 | 7/2004 | Bement et al. | | |
| 7,009,799 B2 | 3/2006 | Sassolini et al. | | |
| 7,587,813 B2 * | 9/2009 | Miyamori | | 29/738 |

* cited by examiner

*Primary Examiner* — Jason C Olson
(74) *Attorney, Agent, or Firm* — McCarthy Law Group

(57) ABSTRACT

An apparatus is provided having a data transfer member, and a medium supported by a base adjacent the data transfer member. A medium tilting device supports the base and is selectively positionable to tilt the medium with respect to the data transfer member to simulate presenting the head to the medium at a desired angular orientation. A sensor measures a characteristic associated with a data transfer relationship between the data transfer member and the medium.

19 Claims, 6 Drawing Sheets

DATA TRANSFER ASSEMBLY PERFORMANCE CHARACTERISTICS TESTING

FIELD

The present embodiments relate to data storage devices and more particularly without limitation to an apparatus and associated method for parametrically optimizing the performance characteristics of a data transfer assembly.

BACKGROUND

Approaches used in performing precise measurements of components and component assemblies in electronics equipment have had to adapt to rapidly changing events affecting factory processes. For example, the sheer size of the components and assemblies has rendered some past measurement approaches obsolete, as minaturization has fully taken hold of the electronics market. Also, although the electronics package is continually shrinking, the converse is generally true for the electronics feature set that is offered. That is, a predominant demand driving the electronics market in the recent past and for the foreseeable future is for more complex and more capable devices in ever-smaller sizes.

To keep pace with these changing events, manufacturers have replaced static measuring tools and fixtures with highly complex processor controlled measurement systems. Successful efforts have also been employed to reengineer the factory to build quality into the process rather than inspect quality into the finished goods.

These and other recent improvements in the art have significantly improved not only the ability to perform precise measurements, but have also made gains in the often competing goals of enhanced quality and faster throughput. It is to the furthering of those efforts that the embodiments of the present invention are directed.

SUMMARY OF THE INVENTION

The present embodiments are generally directed to an apparatus and associated method for optimizing the interrelationships of a data transfer member in a data transfer relationship with a medium.

In some embodiments an apparatus is provided having a data transfer member, and a medium supported by a base adjacent the data transfer member. A medium tilting device supports the base and is selectively positionable to tilt the medium with respect to the data transfer member to simulate presenting the head to the medium at a desired angular orientation. A sensor measures a characteristic associated with a data transfer relationship between the data transfer member and the medium.

In some embodiments a method is provided that includes obtaining a tester having a data transfer member operably disposable in a data transfer relationship with a medium supported by a base, the tester further having a medium tilting device that is selectively positionable to tilt the base and, in turn, tilt the medium with respect to the data transfer member to simulate presenting the head to the medium at a desired angular orientation. The method further includes moving the medium with respect to the data transfer member while measuring a characteristic associated with the data transfer relationship. The method further includes operating the medium tilting device to change the angle of the medium with respect to the data transfer member without disrupting the moving the medium step. The method further includes measuring the characteristic associated with the data transfer relationship at the changed angle of the medium with respect to the data transfer member.

In some embodiments a tester is provided that includes a data transfer member in a data transfer relationship with a medium, and means for optimizing the data transfer relationship by positionally varying the data transfer member and the medium to each of a respective plurality of predefined orientations while continuously monitoring a characteristic of the data transfer relationship.

DETAILED DESCRIPTION

Figure 1:
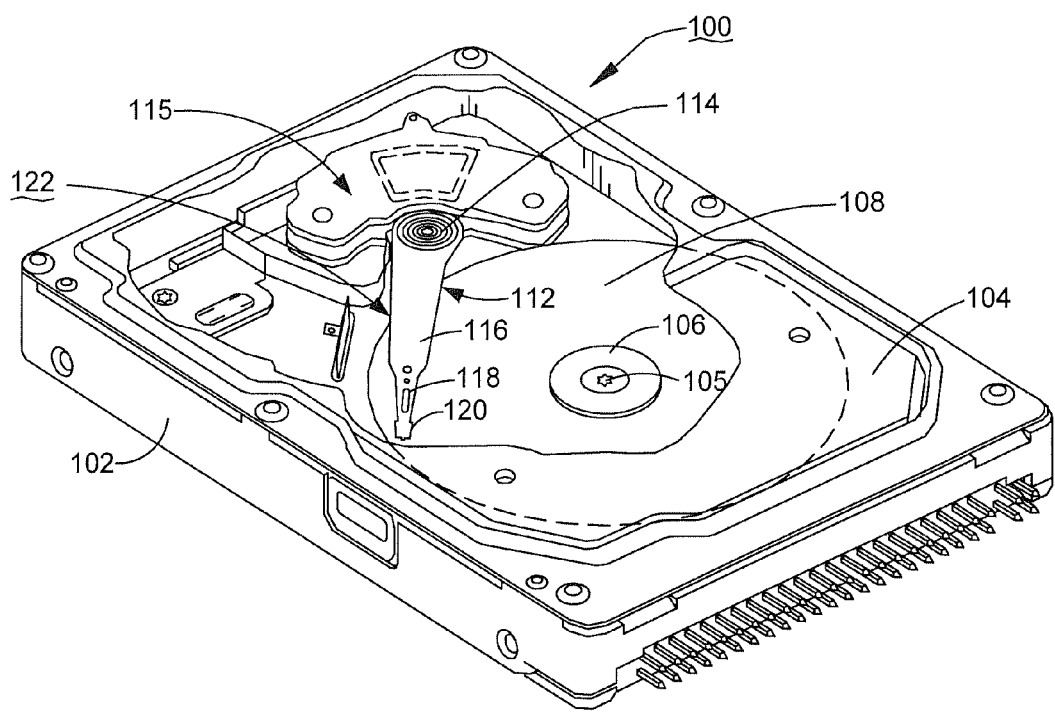
FIG. 1 is an isometric depiction of a data storage device having features determined by practicing embodiments of the present invention.

Referring to the drawings in general, and more particularly to FIG. 1 that shows an isometric view of a data storage device 100 (or "drive") suited for carrying out illustrative embodiments of the present invention. Although the following description describes an apparatus and method used in precisely designing attributes for components of the drive 100, the present embodiments as contemplated herein and as claimed are not so limited. The skilled artisan will readily understand the present embodiments are equivalently useable in performing precise design of components of other devices as well. As such, an enumeration of all useful applications of the present embodiments is not necessary for the skilled artisan to comprehend the claimed scope of the present embodiments.

The drive 100 has an actuator 112 with an arm 116 supporting a suspension 118 that, in turn, supports a head 120 (or "data transfer member") at a distal end thereof in a data transfer relationship with a data storage medium 108. The actuator 112, a bearing 114 supported by the actuator 112, and the head 120 are typically attached to the drive 100 as a subassembly component referred to as a head stack assembly ("HSA") 122.

Figure 2:
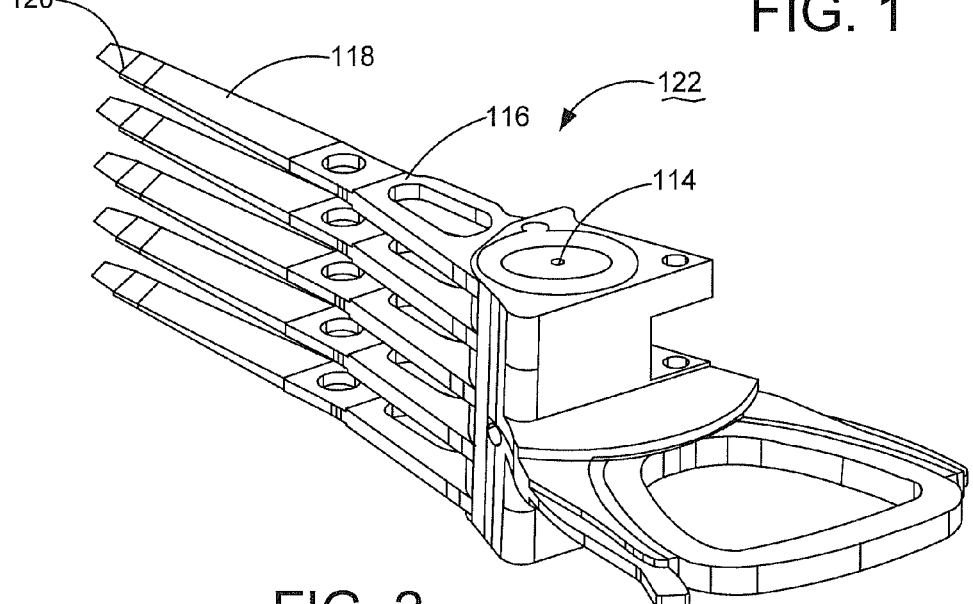
FIG. 2 is an isometric depiction of the head stack assembly of the data storage device of FIG. 1.

FIG. 2 depicts an HSA 122 with multiple heads 120 used in a drive 100 having a stack of multiple mediums 108, with one medium 108 operably disposed in each of the gaps between adjacent opposing heads 120 so that one head 120 is operably disposed adjacent each of the medium 108 surfaces.

Figure 3:
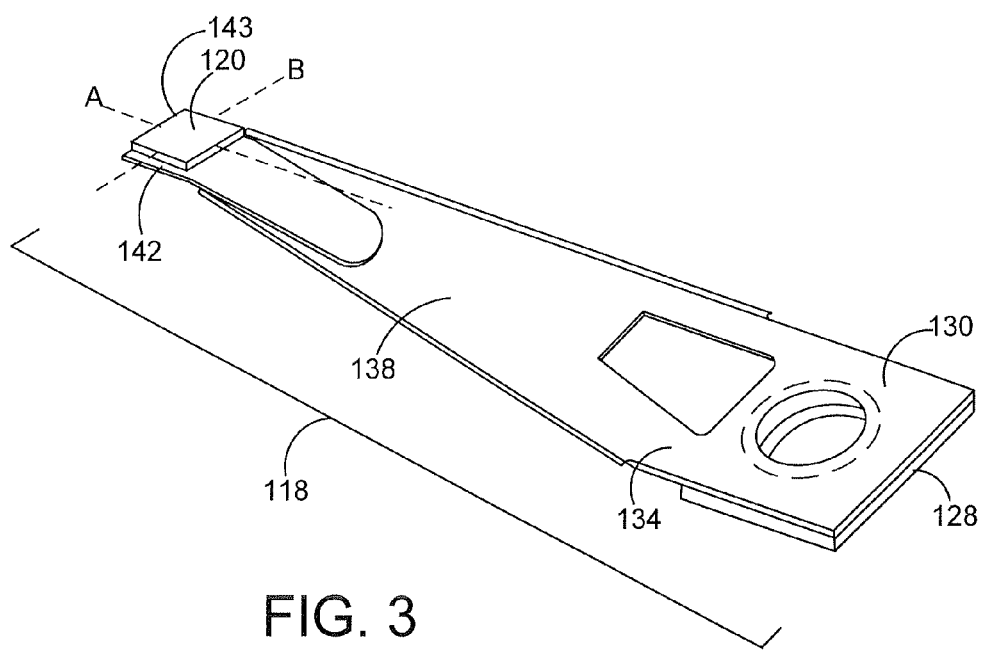
FIG. 3 is an isometric depiction of the suspension assembly of the actuator of FIG. 2.

FIG. 3 is an isometric depiction of the suspension 118 that is attached at a proximal end 128 thereof to the arm 116 (FIG. 2). The suspension 118 has a spring section 134 that permits a predetermined flexure of the head 120 relative to a mounting section 130. The spring section 134 provides a preload bias of the head 120 toward the medium 108. The preload bias is countered by airflow pressure against the head 120 from the spinning medium 108 in the loaded state of the head 120. Balancing the preload bias and the airflow pressure results in a desired fly height of the head 120 adjacent the medium 108 in the loaded state. A gimbal 142 is depicted as being attached to a load beam 138 forming a distal end of the suspension 118. A slider 143 is attached to the gimbal 142 and supports, in turn, the head 120.

In order to provide the desired fly height characteristics, the slider 143 must be statically offset in relation to the mounting portion 130 within predetermined manufacturing tolerances. The position of the slider 143 is measured in terms of the pitch static attitude and roll static attitude. The pitch static attitude, or pitch aspect, is a measurement of the planar disposition of the slider 143 in relation to rotation around axis B. The roll static attitude, or roll aspect, is a measurement of the planar disposition of the slider 143 in relation to rotation around axis A. The static offset and pitch/roll static attitude are designed to be within predetermined tolerances to ensure that the head 120 will fly within a zone adjacent a selected data storage track in which it is capable of a reliable data transfer relationship with the storage medium 108.

Figure 4:
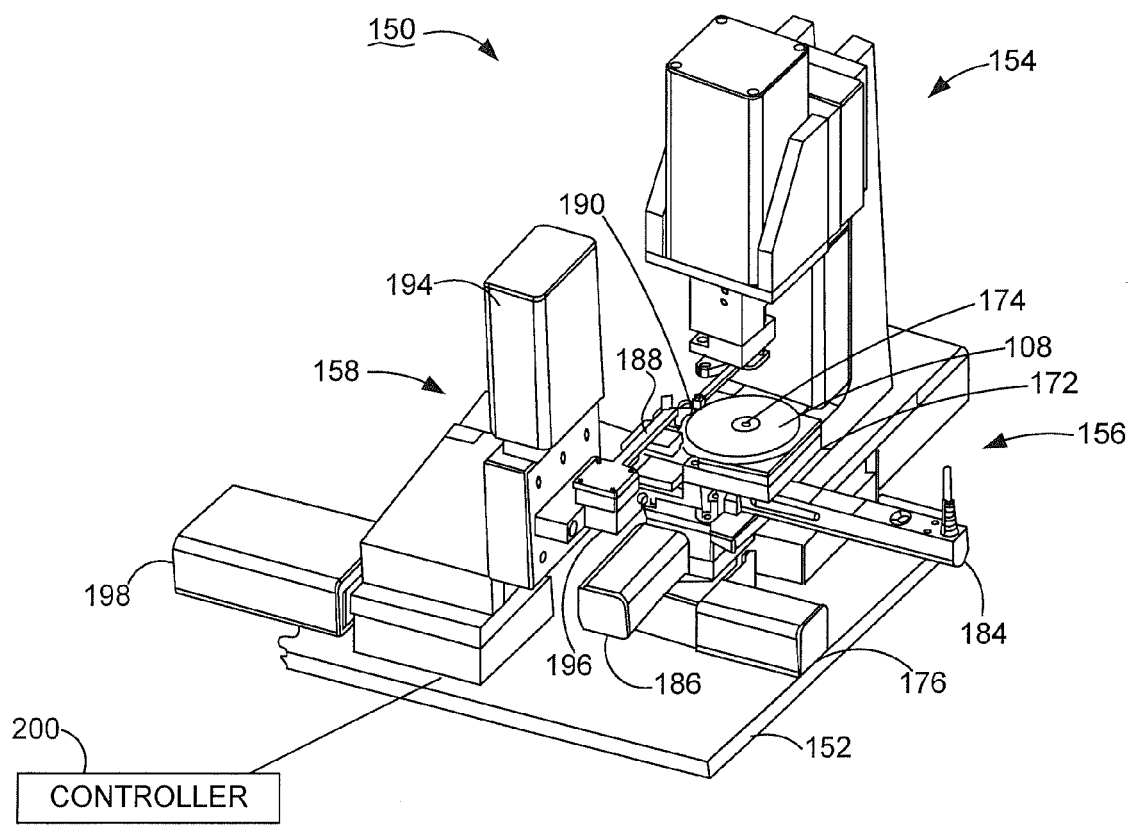
FIG. 4 is an isometric depiction of a tester apparatus constructed in accordance with embodiments of the present invention.

FIG. 4 is an isometric depiction of a tester apparatus 150 that is constructed in accordance with embodiments of the present invention. The apparatus 150 has a base 152 supporting a number of assemblies, namely an actuator stage 154, a disc stage 156, and a ramp stage 158.

Figure 5:
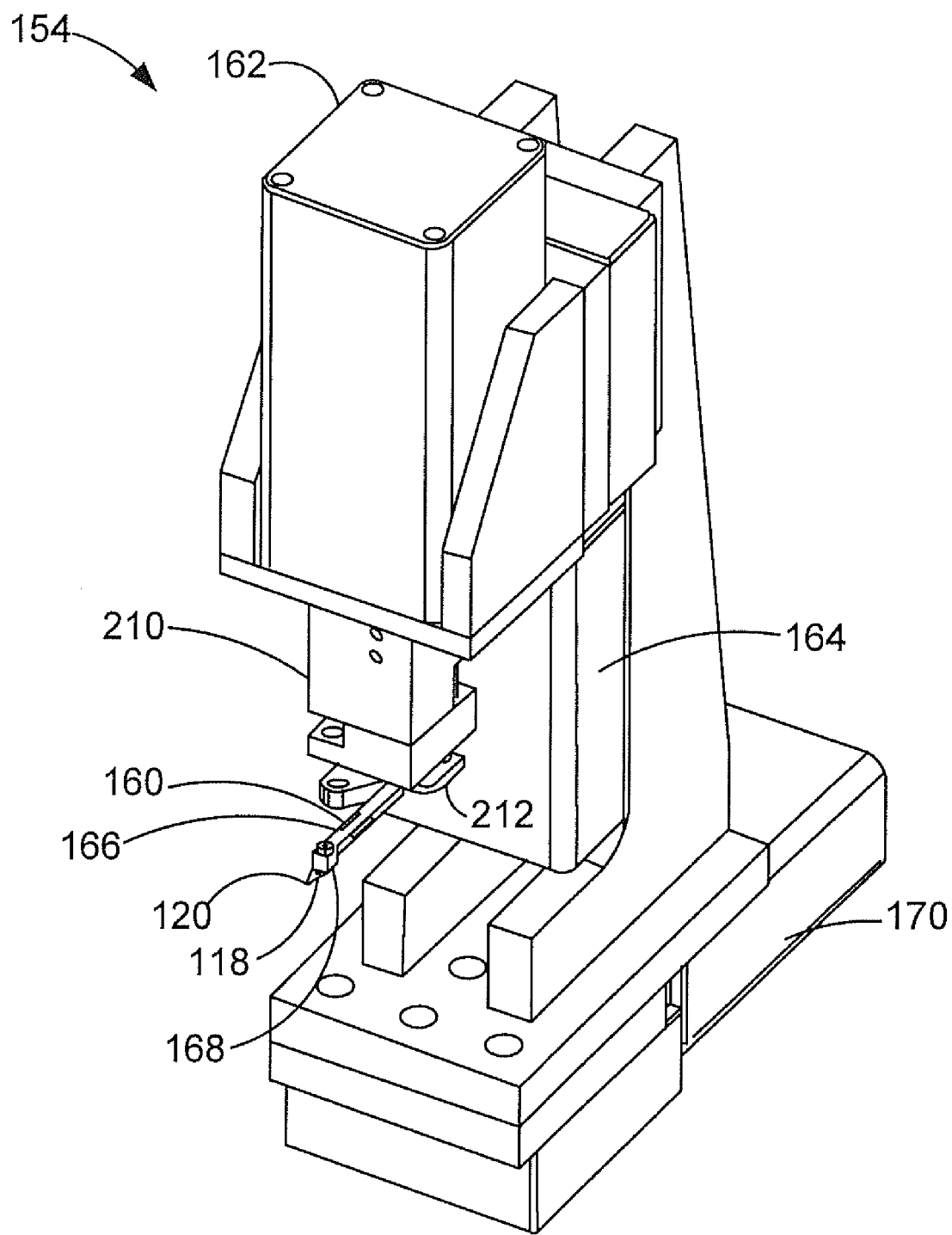
FIG. 5 is an enlarged detail of the actuator stage of the tester apparatus of FIG. 4.

FIG. 5 is an enlarged detail depiction of the actuator stage 154 that has an arm 160 for supporting the suspension 118 that includes the data transfer member (or "head") 120 at a distal end thereof. The arm 160 is connected to a translation device such as a servo motor 162 that is controllable to selectively position the head 120 radially across the medium 108 (FIG. 4). For reasons discussed below, the medium 108 can be selectively angled with respect to the head 120. For reference, the servo motor 162 selectively sweeps the head 120 across the medium 108 within a plane that is substantially parallel with a nominal angular position of the medium 108 that represents the relationship of the medium 108 to the head 120 in the storage device 100. This sweeping action permits moving the head 120 radially away from the medium 108 to contactingly engage a ramp (depicted below) to unload the head 120 from the medium 108. The actuator stage 154 is equipped with controls to vary the velocity profile with which the head 120 is moved to approach and ultimately contact the ramp.

The servo motor 162 is moveably supported by another translation device such as a linear slide 164 with encoder controls to vary the spatial separation (or "z-height") between the head 120 and the medium 108. That is, the linear slide 164 selectively moves the head 120 substantially orthogonal to the medium 108 at the nominal angular orientation of the medium 108. Varying the z-height alters the loading on the suspension 118 imparted by the fluid currents generated by the spinning medium 108. The loading force can be measured by strain gauges 166 positioned on the suspension 160. For instance, a pair of opposing strain gauges on the top and bottom of the arm 160 can measure the loading force, while a pair of opposing strain gauges on the sides of the arm 160 can measure the frictional force.

A sensor 168 is mounted near the head 120 to detect a qualitative characteristic associated with the data transfer relationship between the head 120 and the medium 108. In some embodiments an acoustic emissions ("AE") sensor can be used to measure perturbations that tend to interfere with or at least degrade the quality of the data transfer relationship.

Finally, the linear slide 164 is moveably supported upon another linear slide 170 with encoder controls for moving the head 120 to accommodate for testing of different size medium 108, and for different length suspensions 118. For example, the linear slide 170 can move the arm 160 to an inner position for testing with a relatively smaller medium 108 and then move the arm 160 outwardly for testing with a relatively larger medium 108.

Figure 6:
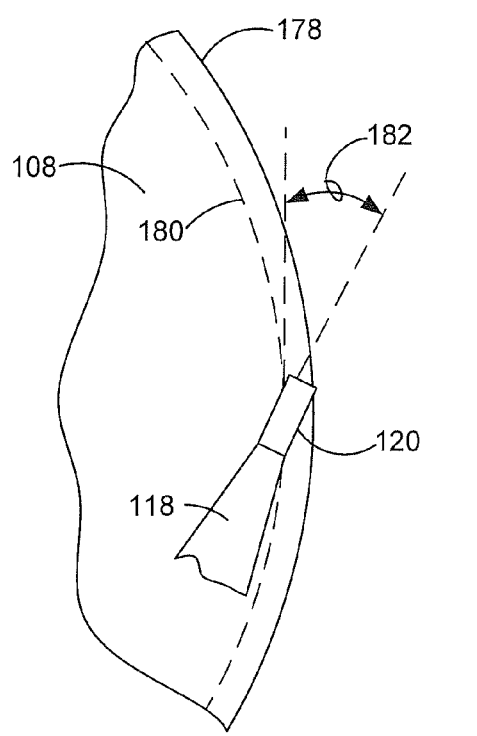
FIGS. 6 and 7 diagrammatically depict altering the skew angle of the head in relation to the medium in accordance with the present embodiments.
Figure 7:
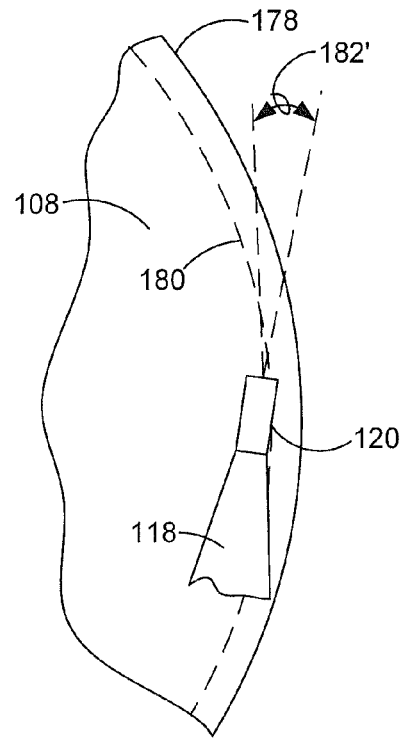

Returning to FIG. 4, the disc stage 156 has a base 172 that encloses a motor that operably rotates the medium 108 around a spindle axis 174. The base 172 is ultimately supported upon a turret 176 that selectively rotates the base 172 and, in turn, rotates the medium 108 around an axis other than the spindle axis 174. The enlarged detail view of FIG. 6 diagrammatically depicts an outer edge 178 of the medium 108 and a nearby load/unload location 180 of the medium 108. A skew angle 182 is defined between the longitudinal axis of the suspension 118 and the tangential direction of the load/unload location 180 when the head 120 is moved to the load/unload location 180. FIG. 7 is a similar depiction but illustrating how selectively positioning the turret 176 changes (in this case decreases) the skew angle 182. This permits varying the skew angle 182 as one of the parameters considered in optimizing the performance characteristics of the suspension both when loaded and when unloaded.

The base 172 is immediately supported upon a first tilting device 184 equipped with controls making it selectively positionable to angle the medium 108 with respect to the data transfer member 120 along a first tilting axis. FIG. 4 depicts the head 120 having been moved to the load/unload position 180 (FIG. 6) of the medium 108. The first tilting axis is coplanar with the axis A (FIG. 3) defined by the suspension 118 at the load/unload position 180. Because the head 120 is spatially separated from the medium 108 only by the fly height, the tilting axis and the axis A can be said to be coexistent within a measurable degree of error so that the amount of tilting around the tilting axis can simulate the amount of roll static attitude of the head 120. Alternatively, if the spatial separation presents more than negligible error then the actual roll static attitude can be precisely calculated in terms of the known amount of medium 108 tilt around the first tilting axis.

The first tilting device 184 is immediately supported upon a second tilting device 186 that is, in turn, immediately supported upon the turret 176. The second tilting device 186 is likewise equipped with controls making it selectively positionable to angle the medium 108 with respect to the data transfer member 120 along a second tilting axis. Preferably, the second tilting axis is used to simulate rotation around the B axis (FIG. 3) of the head 120 when it is located at the load/unload position 180 as described above for the simulation of the rotation around the B axis.

Selective operation of the tilting devices 184, 186 thus permits simulating various different combinations of pitch static attitude and roll static attitude while continuously monitoring the AE sensor for resulting perturbation levels that are indicative of the qualitative effects of pitch static attitude and roll static attitude on the data transfer relationship. In some embodiments the dual axis tilting assembly described above can be accomplished by orthogonally stacking two goniometers represented by the tilting devices 184, 186

Figure 8:
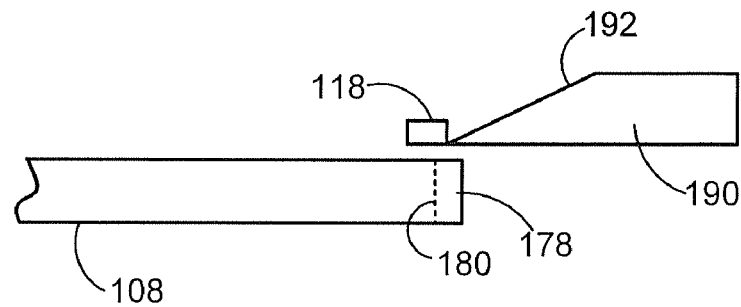
FIG. 8 diagrammatically depicts the head at the load/unload location in accordance with the present embodiments.

The ramp stage 158 includes an arm 188 supporting a ramp 190 at a distal end thereof. FIG. 8 diagrammatically depicts how some portion of the suspension 118 makes initial contacting engagement with an angled contact surface 192 of the ramp 190 when the head 120 is operably moved to the load/unload location 180 of the medium 108. In some embodiments the load beam 138 (FIG. 3) makes the contacting engagement, in other embodiments the suspension 118 is provided with a lift tab (not depicted) that makes the contacting engagement. In any event, the head 120 can be jogged away from ramp 190 at the load/unload location 180 to measure AE emissions in the loaded state, and can alternatively be jogged toward the ramp 190 at the load/unload location 180 to measure AE emissions in the unloaded state, all the while maintaining a desired set of pitch and roll static attitudes as set by previous selective positioning of the tilting devices 184, 186. Opposing strain gauges can be used on the top and bottom of the ramp to measure the ramp contact force, and opposing strain gauges can be used on the sides of the ramp to measure ramp friction force.

The medium 108 in FIG. 8 is depicted as being disposed in the nominal angular position (zero tilt in both axes) with respect to the head 120, the same as what exists in the storage device 100 (FIG. 1). The arm 188 is ultimately supported upon a translation device such as the depicted linear slide 194 with encoder controls to selectively move the ramp 190 substantially orthogonally to the medium 108 when the medium 180 is disposed in the nominal angular position. This vertical adjustment permits investigating different ramp heights as a parametric value in optimizing load/unload performance. Different suspension 118 requiring different ramp heights can be investigated as well. A ramp tilting device 196 such as a goniometer connects the arm 188 to the linear slide 194. This permits selectively altering the angle with which the contact surface 192 (FIG. 8) of the ramp 190 intersects the path of head 120 travel when being moved to the unloaded state. Finally, another translation device such as a linear slide 198 with encoder controls permits moving the ramp toward and away from the medium 108 in order to accommodate testing of different size medium 108.

Figure 9:
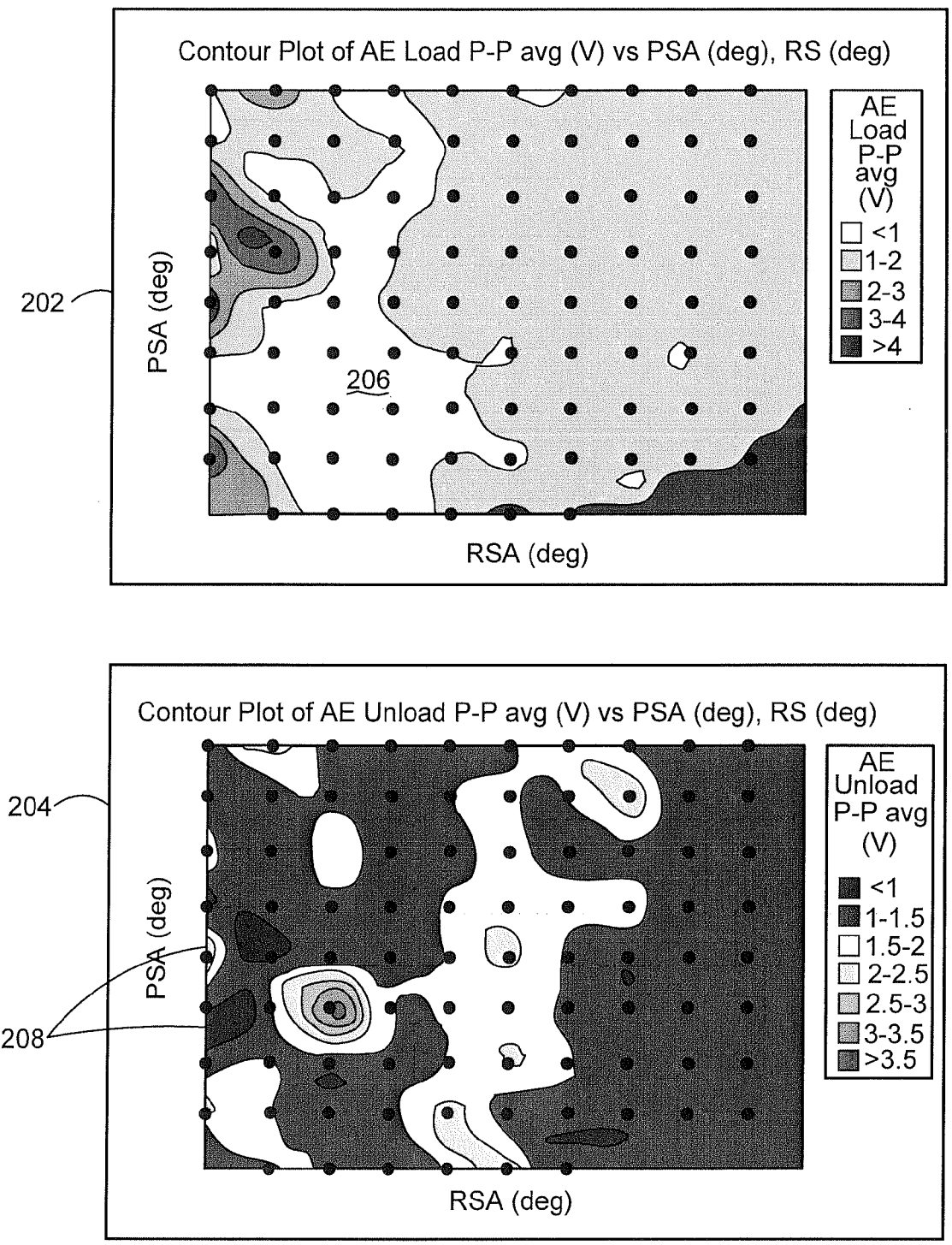
FIG. 9 graphically depicts contour maps identifying regions of minimum acoustic emissions for the loaded and unloaded states, respectively, in accordance with the present embodiments.

FIG. 4 also diagrammatically depicts a controller 200 that executes processing instructions stored in memory to store AE sensor measurements resulting from a plurality of trials in which both the desired pitch static attitude and the desired roll static attitude are varied incrementally throughout predefined ranges. The stored data is then reported in a meaningful way, such as via mapping the values in the form of the contour plots 202, 204 of FIG. 9 depicting resultant data comparing the AE emissions in the loaded and unloaded states, respectively. Data points are collected for both the loaded state and the unloaded state for various combinations of pitch static attitude and roll static attitude that are mapped respective to the ordinate scale and abscissa scale, respectively, in plots 202, 204.

The mapped results in FIG. 9 are from testing performed in accordance with the claimed embodiments of this invention. Knowledge of the values for the pitch static attitude and roll static attitude is not necessary for the skilled artisan to readily understand the nature and scope of the claimed embodiments. Generally, however, the pitch static attitude and roll static attitude values both increase from the intersection of the ordinate and abscissa values. AE values corresponding to the mapped areas are likewise normalized, nonetheless the skilled artisan understands that the optimized combination of pitch static attitude and roll static attitude is found within the region that is part of both the region 206 of minimum AE emissions in the loaded state and that is also part of the region 208 of minimum AE emissions in the unloaded state.

In addition to the apparatus described above, the claimed embodiments also contemplate a method that includes obtaining the tester (such as 150) having the data transfer member (or "head" such as 120) operably disposable in the data transfer relationship with the medium (such as 108) as it is operably supported by the base (such as 172). The obtained tester further has the medium tilting device (such as 184, 186) that is selectively positionable to tilt the base and, in turn, tilt the medium with respect to the head to simulate presenting the head to the medium at a desired angular orientation.

The method continues by rotating the medium with respect to the head and measuring a qualitative characteristic (such as AE emissions) associated with the data transfer relationship. After the qualitative characteristic is stored, the method then operates the medium tilting device to change the angle of the medium with respect to the head without disrupting the rotation of the medium. The method then includes measuring the qualitative characteristic again that is associated with the data transfer relationship at the changed angle of the medium with respect to the head.

As described above, preferably the operating of the medium tilting device is characterized by selectively tilting the medium to simulate presenting the head to the medium at a desired pitch static attitude and at a desired roll static attitude.

The method can also include moving the head within a plane that is substantially parallel to a nominal angular position of the medium, in order to move between an unloaded state, whereat a member supporting the head contactingly engages a ramp (such as 190), and a loaded position, whereat the member supporting the head clearingly disengages the ramp, while maintaining the medium at an angle that simulates the desired pitch static attitude and desired roll static attitude and measuring the characteristic associated with the data transfer relationship at each of the loaded position and the unloaded position.

The method can also include selectively altering an angle with which a contact surface of the ramp (such as 192) intersects a path of travel of the head and measuring the characteristic associated with the data transfer relationship at each of a plurality of angles.

The method can also include moving the head within a plane that is substantially orthogonal with the nominal angular position of the medium to vary a spatial separation between the head and the medium and, in turn, varies a loading force acting on a suspension member (such as 118) supporting the head while maintaining the medium at an angle that simulates the desired pitch static attitude and desired roll static attitude and measuring the characteristic associated with the data transfer relationship at each of a first spatial separation and a second spatial separation.

The method can also include rotating the medium around an axis other than the spindle axis to alter a skew angle (such as 182) between the head and a storage location of the medium while maintaining the medium at an angle that simulates the desired pitch static attitude and desired roll static attitude and measuring the characteristic associated with the data transfer relationship at each of a first skew angle and a second skew angle.

The method can also include storing each of a plurality of the characteristics measurements and contour mapping (such as 202, 204) the stored values for a plurality of trials in which each of the desired pitch static attitude and the desired roll static attitude are varied throughout predefined ranges.

Figure 10:
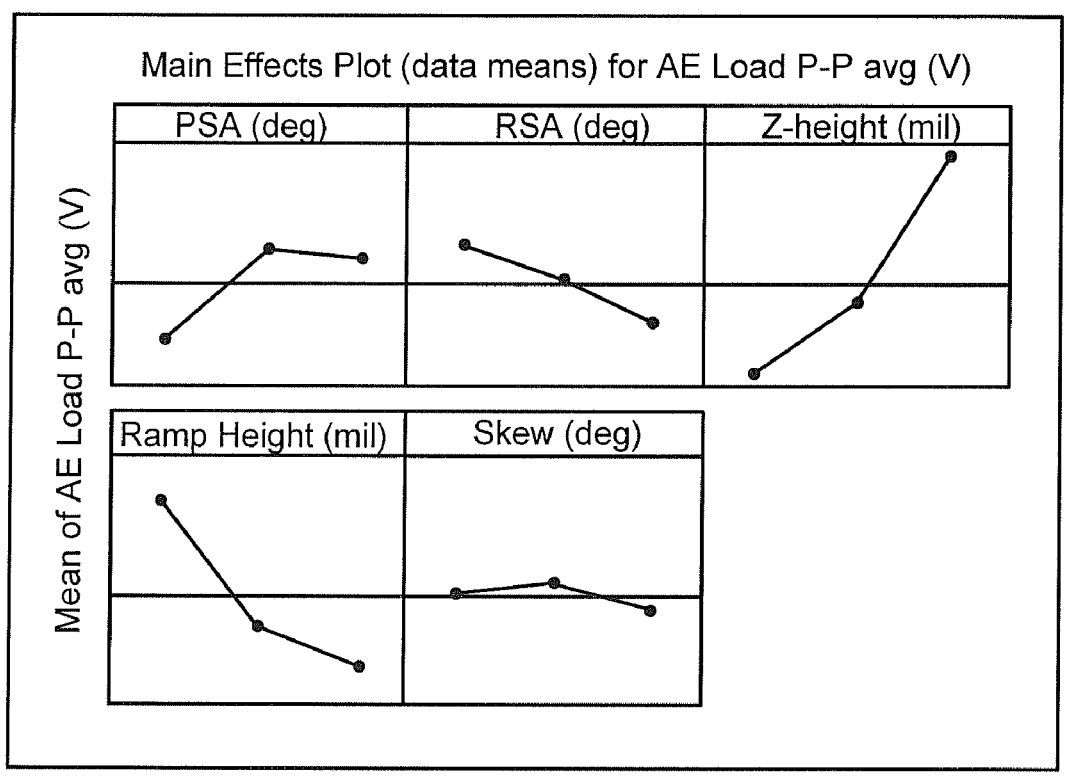
FIG. 10 graphically depicts a main effects plot in accordance with the present embodiments.

In addition to using the apparatus and method of the present embodiments to optimize the set of pitch static attitude and roll static attitude, the other parametric values described above can be evaluated by the controller 200 by executing instructions to process the stored data and provide a statistical analysis such as the main effects plot depicted in FIG. 10. Preferably, the controller 200 is programmed to fully automate the test process in steps of a statistical designed experiment ("DOE"). That is, the DOE plan is input to the controller 200 which then takes over total control of the stages, sets parameters, and collects a complete set of data without stopping the medium 108 from spinning. This data was collected during experimentation in developing the claimed embodiments. Again, knowledge of the actual values is not necessary for the skilled artisan to understand the nature and scope of the claimed embodiments. Generally, however, the variance of selected key parameters is compared to the mean AE load for each of three increasing values. Thus, for example, it will be seen that the observed AE emissions are directly and significantly related to the z-height setting.

Returning now to FIG. 5, it will be recalled that the dual axis base tilting arrangement 184, 186 (FIG. 4) is preferably calibrated to simulate the desired pitch static attitude and desired roll static attitude when the head 120 is positioned at the load/unload location 180. Complex geometric compensation would be necessary to derive the effective pitch static attitude and roll static attitude provided by tilting the medium 108 when the head 120 is located somewhere other than at or very near the load/unload location 180. In alternative embodiments the actuator stage 154 can include a two-axis tilting assembly 210. The tilting assembly 210 depicted in FIG. 5 includes the arm 160 being supported by a tilting plate 212 making contacting engagement with a fulcrum aligned with the roll axis A (FIG. 3). A pair of stepper motors (not shown) is connected to the tilting plate 212 and selectively move it about the fulcrum to present the head 120 to the medium 108 at the desired pitch static attitude and desired roll static attitude for any radial position of the head 120 across the medium 108 and ramp 190.

Generally, the claimed embodiments contemplate a tester that includes a data transfer member in a data transfer relationship with a medium, and means for optimizing the data transfer relationship by positionally varying the data transfer member and the medium to each of a respective plurality of predefined orientations while continuously monitoring a characteristic of the data transfer relationship. For purposes of this description and meaning of the appended claims, the meaning of "means for optimizing" includes the structure described herein and structural equivalents thereof that are capable of positionally varying the data transfer member and the medium with respect to each other while continuously monitoring the characteristics of the data transfer relationship. The meaning of "means for optimizing" expressly does not include previously attempted solutions whereby a first suspension having a first set of pitch and roll static attitude values is tested, and then that suspension is replaced with another suspension have a different second set of pitch and roll static attitude values for more testing.

The foregoing discussion has been presented for purposes of illustration and description. The foregoing is not intended to limit the embodiments to the form or forms disclosed herein. In the foregoing for example, various features of the claimed invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of any of the disclosed embodiments. Thus, the following claims are hereby incorporated herein, with each claim standing on its own as separate embodiments of the invention.

Moreover, though the description of the claimed invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed:

1. An apparatus comprising:
   a data transfer member;
   a medium supported by a base adjacent the data transfer member;
   a data transfer member tilting device that is selectively positionable to angularly move the data transfer member with respect to the medium at a desired orientation;
   a medium tilting device supporting the base and that is selectively positionable to tilt the medium with respect to the data transfer member at a desired angular orientation; and
   a sensor that measures a characteristic associated with a data transfer relationship between the data transfer member and the medium when the medium is rotating relative to the data transfer member.

2. The apparatus of claim 1 wherein the medium tilting device is selectively positionable to simulate presenting the data transfer member to the medium with a desired pitch static attitude and with a desired roll static attitude.

3. The apparatus of claim 1 further comprising a planar translation device that is selectively positionable to move the data transfer member within a plane that is substantially parallel with a nominal angular position of the medium.

4. The apparatus of claim 1 further comprising an orthogonal translation device that is selectively positionable to move the data transfer member substantially orthogonally to the medium at a nominal angular position of the medium.

5. The apparatus of claim 3 further comprising:
   a ramp to which the data transfer member is moveable via the planar translation device to operably unload the data transfer member from the medium; and
   a ram translation device that is selectively positionable to move the ram relative to the medium.

6. The apparatus of claim 5 wherein the ramp translation device is selectively positionable to move the ramp substantially orthogonally to the medium at a nominal angular position of the medium.

7. The apparatus of claim 5 wherein the ramp translation device is selectively positionable to define an angle with which the data transfer member operably engages the ramp while being moved via the planar translation device.

8. The apparatus of claim 1 wherein the medium operably rotates around a spindle axis, and further comprising a skew device that is selectively positionable to rotate the base and, in turn, rotate the medium around an axis different than and parallel to the spindle axis to alter a skew angle between the data transfer member and a storage location of the medium.

9. The apparatus of claim 1 wherein the data transfer member tilting device is selectively positionable to present the data transfer member to the medium with a desired pitch static attitude and with a desired roll static attitude.

10. A method comprising:
obtaining a tester having a data transfer member operably disposable in a data transfer relationship with a medium supported by a base, the tester further having a medium tilting device that is selectively positionable to tilt the base and, in turn, tilt the medium with respect to the data transfer member at a desired angular orientation; and
rotating the medium with respect to the data transfer member while measuring a rotating medium characteristic associated with the data transfer relationship;
operating the medium tilting device to change the angle of the rotating medium with respect to the data transfer member; and
measuring the rotating medium characteristic associated with the data transfer relationship at the changed angle of the rotating medium with respect to the data transfer member; and
mapping measurements obtained by repeating the operating and measuring steps for a plurality of trials in which the angle of the rotating medium with respect to the data transfer member is varied within a predefined rage; and the operating step is characterized by selectively tilting the medium to simulate presenting the data transfer member to the medium at a desired pitch static attitude and at a desired roll static attitude.

11. An apparatus comprising:
a data transfer member;
a medium supported by a base adjacent the data transfer member;
a medium tilting device supporting the base and that is selectively positionable to tilt the medium with respect to the data transfer member at a desired angular orientation; and
an acoustic emissions sensor that measures a characteristic associated with a data transfer relationship between the data transfer member and the medium.

12. An apparatus comprising:
a data transfer member;
a medium supported by a base adjacent the a data transfer member, wherein the medium is operably rotatable around a spindle axis; a skew device that is selectively positionable to rotate the base and, in turn, rotate the medium around an axis different than and parallel to the spindle axis to alter a skew angle between the data transfer member and a storage location of the medium;
a medium tilting device supporting the base and that is selectively positionable to tilt the medium with respect to the data transfer member at a desired angular orientation; and
a sensor that measures a characteristic associated with a data transfer relationship between the data transfer member and the medium; and
computer readable instructions stored in memory that are executable to map sensor measurements resulting from a plurality of trials in which the desired angular orientation is varied incrementally within a predefined range.

13. The apparatus of claim 11 further comprising a planar translation device that is selectively positionable to move the data transfer member within a plane that is substantially parallel with a nominal angular position of the medium.

14. The apparatus of claim 11 further comprising an orthogonal translation device that is selectively positionable to move the data transfer member substantially orthogonally to the medium at a nominal angular position of the medium.

15. The apparatus of claim 13 further comprising:
a ramp to which the data transfer member is moveable via the planar translation device to operably unload the data transfer member from the medium; and
a ramp translation device that is selectively positionable to move the ramp relative to the medium.

16. The apparatus of claim 11 further comprising a data transfer member tilting device that is selectively positionable to angularly move the data transfer member with respect to the medium at a desired orientation.

17. The apparatus of claim 12 further comprising a planar translation device that is selectively positionable to move the data transfer member within a plane that is substantially parallel with a nominal angular position of the medium.

18. The apparatus of claim 12 further comprising an orthogonal translation device that is selectively positionable to move the data transfer member substantially orthogonally to the medium at a nominal angular position of the medium.

19. The apparatus of claim 17 further comprising:
a ramp to which the data transfer member is moveable via the planar translation device to operably unload the data transfer member from the medium; and
a ramp translation device that is selectively positionable to move the ramp relative to the medium.

* * * * *